United States Patent
Karaoguz et al.

(10) Patent No.: US 9,549,309 B2
(45) Date of Patent: Jan. 17, 2017

(54) SYSTEM AND METHOD PROVIDING LOCATION BASED WIRELESS RESOURCE IDENTIFICATION

(71) Applicant: Broadcom Corporation, Irvine, CA (US)

(72) Inventors: Jeyhan Karaoguz, Irvine, CA (US); James D. Bennett, Hroznetin (CZ)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 14/880,584

(22) Filed: Oct. 12, 2015

(65) Prior Publication Data

US 2016/0037324 A1    Feb. 4, 2016

Related U.S. Application Data

(63) Continuation of application No. 11/449,274, filed on Jun. 8, 2006, now abandoned.
(Continued)

(51) Int. Cl.
    *H04W 48/16*        (2009.01)
    *H04W 8/00*         (2009.01)
    (Continued)

(52) U.S. Cl.
    CPC .............. *H04W 8/005* (2013.01); *H04L 67/18* (2013.01); *H04W 48/16* (2013.01); *H04W 48/18* (2013.01); *H04W 4/02* (2013.01); *H04W 8/183* (2013.01)

(58) Field of Classification Search
    CPC ................................................ H04L 39/06027
    (Continued)

(56) References Cited

U.S. PATENT DOCUMENTS

| | | |
|---|---|---|
| 6,801,777 B2 | 10/2004 | Rusch |
| 6,954,649 B2 | 10/2005 | Kotzin |

(Continued)

FOREIGN PATENT DOCUMENTS

| | | |
|---|---|---|
| WO | WO03055264 A1 | 7/2003 |
| WO | WO03075489 A1 | 9/2003 |

(Continued)

OTHER PUBLICATIONS

European Search Report, App. No. EP06015362, Dec. 22, 2006, pp. 1-2.

*Primary Examiner* — Muthuswamy Manoharan
(74) *Attorney, Agent, or Firm* — Brinks Gilson & Lione

(57) ABSTRACT

A system and method providing location based wireless resource identification in a communication system. Various aspects may comprise determining a location of a communication system (e.g., a multimode communication device). One or more wireless resources may then, for example, be identified based, at least in part, on the determined location. Additionally for example, respective manners of communicating with identified wireless resources may be determined and utilized for communication between the communication system and the identified wireless resources. A communication system may, for example, comprise a location determination module adapted to determine a location of the communication device. A wireless resource identification module may, for example, be adapted to identify one or more wireless resources based, at least in part, on the determined location. Also for example, a communication manager module may be adapted to determine respective manners of communicating with the identified wireless resources.

20 Claims, 5 Drawing Sheets

Related U.S. Application Data

(60) Provisional application No. 60/739,802, filed on Nov. 22, 2005.

(51) Int. Cl.
  *H04W 48/18* (2009.01)
  *H04L 29/08* (2006.01)
  *H04W 4/02* (2009.01)
  *H04W 8/18* (2009.01)

(58) Field of Classification Search
  USPC .......................................................... 370/356
  See application file for complete search history.

(56) References Cited

U.S. PATENT DOCUMENTS

| | | | |
|---|---|---|---|
| 7,096,030 | B2 | 8/2006 | Huomo |
| 7,706,369 | B2 | 4/2010 | Roese et al. |
| 8,379,537 | B2 * | 2/2013 | Matsuda ............. H04L 41/0253 370/254 |
| 2002/0094777 | A1 * | 7/2002 | Cannon ................. H04L 63/107 455/41.2 |
| 2005/0239443 | A1 | 10/2005 | Watanabe et al. |
| 2006/0003764 | A1 | 1/2006 | Saglam et al. |
| 2006/0116160 | A1 * | 6/2006 | Fuccello ............... H04W 8/005 455/556.1 |
| 2008/0224825 | A1 * | 9/2008 | Nystrom ............... G06K 7/0008 340/10.1 |

FOREIGN PATENT DOCUMENTS

| | | |
|---|---|---|
| WO | WO03100647 A1 | 12/2003 |
| WO | WO2004056136 A2 | 7/2004 |

\* cited by examiner

SYSTEM AND METHOD PROVIDING LOCATION BASED WIRELESS RESOURCE IDENTIFICATION

PRIORITY CLAIM

The present application is a continuation application of U.S. patent application Ser. No. 11/449,274, filed Jun. 8, 2006, which is related to and claims priority from U.S. Provisional Patent Application Ser. No. 60/739,802, filed Nov. 22, 2005, and titled "SYSTEM AND METHOD PROVIDING LOCATION BASED WIRELESS RESOURCE IDENTIFICATION," the contents of each of which are hereby incorporated herein by reference in their entirety.

CROSS REFERENCE TO RELATED APPLICATIONS

The present application is also related to U.S. patent application Ser. No. 11/217,645, entitled "MULTIMEDIA COMMUNICATION DEVICE WITH CONFIGURATION UPDATE CAPABILITY," filed Sep. 1, 2005 (now U.S. Pat. No. 7,873,384), and U.S. patent application Ser. No. 11/423,049, filed Jun. 8, 2006 (now U.S. Pat. No. 7,929,486), entitled "PROGRAMMABLE WIRELESS ACCESS POINT SUPPORTING CONFIGURATION PROFILE UPDATING," each of which are hereby incorporated herein in their entirety by reference.

BACKGROUND

Communication devices (e.g., mobile communication devices) are continually increasing in popularity. Such communication devices include, for example and without limitation, cellular phones, paging devices, portable email devices, and personal digital assistants. Mobile communication devices, for example, provide the user with the capability to conduct communications while moving through a variety of environments.

Mobile communication devices may operate in accordance with multiple communication modes. For example a mobile communication device may be adapted to operate in a cellular communication mode and a wireless computer network communication mode. Such multimode mobile communication devices may utilize respective radio configurations for each communication mode. For example, various communication modes may correspond to different respective radios and/or different communication protocols.

As mobile communication devices increase in popularity, communication networks providing communication links to such mobile communication devices and various electronic devices providing services to such mobile communication devices are also increasing in popularity. The increase in communication network and device availability provides an increasing number of communication options to mobile communication devices. In addition, as mobile communication devices move between environments, the array of communication networks available to the mobile communication devices also changes.

As the number of mobile communication devices and/or communication networks or other devices increases, the complexity of establishing and maintaining communication links between mobile communication devices and communication networks or other devices also increases. Such increased complexity, in turn, may result in increased power consumption, increased cost, etc.

DETAILED DESCRIPTION

Figure 1:
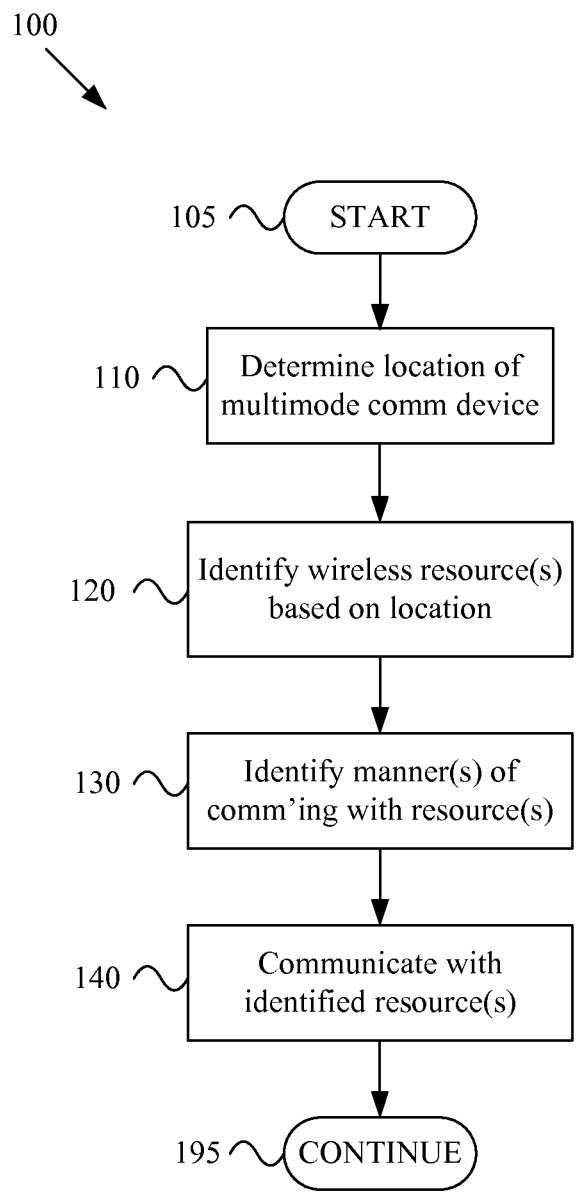
FIG. 1 is a diagram illustrating a first exemplary method for operating a communication system.

FIG. 1 is a diagram illustrating a first exemplary method for operating a communication system. The communication system may comprise characteristics of any of a variety of communication systems (e.g., multimode communication systems). For example and without limitation, the communication system may comprise characteristics of any of a variety of mobile communication devices (e.g., cellular phones, paging devices, portable email devices, etc.). Also for example, the communication system may comprise characteristics of fixed communication systems or devices (e.g., network access points, base stations, satellites, wireless routers, set top boxes, etc.). Further for example, the communication system may comprise characteristics of a variety of electronic devices with wireless communication capability (e.g., televisions, music players, cameras, remote controls, personal digital assistants, handheld computers, mobile gaming devices, etc.).

The following discussion will, at times, refer to various communication modes. For the following discussion, a communication mode may generally be considered to coincide with communication utilizing a particular communication protocol or standard. A non-limiting list of exemplary communication protocols includes various cellular communication protocols (e.g., GSM, GPRS, EDGE, CDMA, WCDMA, TDMA, PDC, etc.), various wireless networking protocols or standards, including WLAN, WMAN, WPAN and WWAN (e.g., IEEE 802.11, Bluetooth, IEEE 802.15, UWB, IEEE 802.16, IEEE 802.20, Zigbee, any WiFi protocol, etc.), various television communication standards, etc.

The exemplary method 100 begins executing at step 105. The exemplary method 100 (and all methods discussed herein) may begin executing for any of a large variety of reasons. For example and without limitation, the exemplary method 100 may begin executing in response to powering-up or resetting the communication system implementing the method 100. Also for example, the exemplary method 100 may begin executing in response to a schedule (e.g., periodically, aperiodically, etc.). Further for example, the exemplary method 100 may begin executing in response to a user input directing the method 100 to begin executing. Additionally for example, the exemplary method 100 may begin executing in response to communication link conditions (e.g., a change in communication link quality, whether better or worse).

The exemplary method 100 may, at step 110, comprise determining the location of the communication system (e.g., a mobile multimode communication device) implementing the method 100. Step 110 may comprise determining the location of the communication system in any of a variety of manners, non-limiting examples of which will be presented below.

For example, step 110 may comprise utilizing location or location-related information received from various types of systems generally associated with positioning information (e.g., terrestrial and/or satellite based positioning systems). As an example, step 110 may comprise receiving and processing global positioning system ("GPS") information to determine the location of the communication system. Step 110 may, for example, utilize a GPS receiver on-board the communication system to receive GPS information.

Also for example, step 110 may comprise utilizing ultra-wideband ("UWB") positioning information to determine the location of the communication system. As an example, step 110 may comprise receiving UWB positioning information from a position-tracking system. Various portions of such a position-tracking system might be internal or external to the communication system.

Further for example, step 110 may comprise receiving location information from a communication network (or network device) with which the communication system implementing the method 100 has established communication. As a non-limiting example, step 110 may comprise establishing a communication link with an access point of a particular personal area network ("PAN") or local area network ("LAN") that notifies the communication system of the network or access point location.

Additionally for example, step 110 may comprise ascertaining location of the communication system implementing the method 100 from one or more detected communication networks. For example, step 110 may comprise utilizing knowledge of communication network location. As a non-limiting example, step 110 may comprise ascertaining that the communication system is in the home when a PAN associated with a home office is detected. As another non-limiting example, step 110 may comprise ascertaining that the communication system is at the office when the office LAN is detected. As a further non-limiting example, step 110 may comprise ascertaining that the communication system is at a particular airport when the airport's LAN is detected, or that the communication system is in a particular city when the city's metropolitan area network ("MAN") is detected. Step 110 may comprise ascertaining location of the communication system based on any of a variety of detected networks (e.g., two-way communication networks, one-way communication networks, television networks, radio networks, etc.).

Further for example, step 110 may comprise ascertaining location of the communication system implementing the method 100 from one or more detected devices. For example, step 110 may comprise utilizing knowledge of device location. As a non-limiting example, step 110 may comprise ascertaining that the communication system is in the home when a home device is detected. Such devices may, for example, include a computer, modem, printer, mouse, keyboard, television, stereo, set top box, environmental control system, alarm system, memory device, telephone, wireless relay, video game box, or any home device with communication capability or other detectable feature. As a further non-limiting example, step 110 may comprise ascertaining that the communication system is in the office when an office device is detected. Such devices may, for example, include an office computer, printer, telephone, modem, router, fax machine, copier, keyboard, mouse, network access point, wireless router/modem, database or any office device with communication capability or other detectable feature.

Step 110 may, for example, comprise determining location of a communication system implementing the method 100 by analyzing communication link conditions. As a non-limiting example, step 110 may comprise determining that the communication system is in the immediate vicinity of the office based on a relatively high-quality communication link between the communication system and the office LAN. Continuing the example, step 110 may alternatively comprise determining that the communication system is at least one block away from the office based on a relatively low-quality communication link between the communication system and the office LAN. As another example, step 110 may comprise determining that the communication system is home but not within the home office based on a relatively high-quality communication link with a home LAN and a relatively low-quality communication link with a home office PAN.

Step 110 may further, for example, comprise determining location of a communication system implementing the method 100 based on user input. As a non-limiting example, a user may explicitly indicate to the communication system that the communication system is located in a particular city, building, room, campus, etc.

In general, step 110 may comprise determining location of the communication system.

The exemplary method 100 may, at step 120, comprise identifying one or more wireless resources based, at least in part, on the determined location (e.g., as determined at step 110). Step 120 may comprise identifying one or more wireless resources in any of a variety of manners, non-limiting examples of which will be presented below.

A wireless resource may generally be considered a resource (e.g., a wireless communication network, network access point or other electronic device with wireless communication capability) with which a communication system may communicate. For example, a wireless resource may comprise a particular wireless communication network or wireless network access point. Also for example, a wireless resource may comprise a printer or memory device with wireless communication capability. Further for example, a wireless resource may comprise a wireless link to a wired or optical communication network. Still further for example, a wireless resource may comprise a wireless LAN, WAN or PAN access point. Yet further for example, a wireless resource may comprise a wireless-capable monitor, print, audio input or output device, camera, keyboard, telephone, mouse, intercom system, environmental control system, satellite transceiver, television, etc.

Identifying one or more wireless resources may generally comprise determining any of a large variety of types of information utilized to identify a wireless resource. For example, wireless resource identification may comprise a single piece of information related to a particular wireless resource or may comprise a relatively large amount of information related to a relatively complex array of wireless resources. For example and without limitation, wireless resource identification information may comprise resource name, type, address (universal and/or local), characteristics, capabilities, communication protocols, availability, status, location, access privileges, etc. The following examples will provide non-limiting examples of information that might be included in a wireless resource identification.

Step 120 may, for example, comprise identifying a list of wireless resources associated with the determined location. Such a list of wireless resources may, for example, comprise a list of wireless communication networks associated with the determined location. Such a list of wireless resources may, for example, comprise a list of electronic devices with wireless communication capability that are associated with the determined location. Such a list may also, for example, comprise any of a variety of types of information associated with a wireless resource (e.g., resource name, type, address (universal and/or local), characteristics, capabilities, communication protocols, availability, status, location, access privileges, etc.).

A list or other grouping of wireless resources associated with a determined location may, for example, be formed from information stored in a database. Such a database may, for example, reside on-board the communication system (e.g., in a non-volatile memory device) or may reside in another device communicatively coupled to the communication system (e.g., through a communication network, like a LAN or the Internet). Such a database may, for example, comprise stored information correlating one or more locations with one or more respective wireless resources. As will be discussed in more detail later, such a database may be maintained manually or automatically and/or managed off-line or in real-time. A list of wireless resources may, for example, be exclusive or non-exclusive. That is, such a list may, for example, comprise a list of the only wireless resources that the communication system is to utilize or may, for example, comprise a list of primary resources that the communication system is to utilize while allowing for the utilization of other wireless resources that the communication system determines are available.

Step 120 may, for example, comprise identifying a set of wireless resources of a plurality of predetermined sets of wireless resources, each of which might be associated with one or more particular locations. In a non-limiting exemplary scenario, a first set of wireless resources may be associated with a home location, a second set of wireless resources may be associated with an office location, a third set of wireless resources may be associated with a commute (or portion thereof), and a fourth set of wireless resources may be associated with a particular city. Note that in various exemplary scenarios (e.g., located in an office), a plurality of locations may be determined simultaneously (e.g., office, campus and city). Thus, in such exemplary scenarios, a plurality of sets of wireless resources may be simultaneously applicable.

Also for example, step 120 may comprise identifying unknown wireless resources. For example, step 120 may comprise searching for any wireless resources that are recognized and available. Such identification may, for example, be performed in addition to, or in lieu of, identifying known wireless resources. As an example, step 120 may comprise determining that no wireless resources are known to be associated with the present location, and determining to search for all recognized and available resources within range of the location. Such searching may, for example, comprise performing active searching (e.g., sending beacons and waiting for responses) and/or passive searching (e.g., listening for beacons or other signals sent by other devices). As will be mentioned later, information of identified previously unknown resources may be stored in a database for future reference.

Additionally for example, step 120 may comprise verifying the existence and/or availability of known resources. For example, step 120 may comprise first determining a list of wireless resources that are known to be generally available at a particular location, and then attempting to establish communication links with the known devices to verify that the known devices are currently available. As will be discussed later, information related to resource verification may be utilized to update database information for future reference.

In various exemplary scenarios, step 120 may also comprise failing to identify any wireless resources associated with the location. In such a scenario, as discussed above, step 120 may comprise searching for unknown resources. Alternatively, in such a scenario, step 120 may comprise not searching for other resources (e.g., in an energy-saving mode or in accordance with a user-defined behavioral profile).

Still further for example, step 120 may comprise interacting with a user regarding wireless resources. For example, step 120 may comprise receiving a user input identifying a set of wireless resources to utilize until directed otherwise by the user. Also for example, step 120 may comprise presenting a plurality of sets of wireless resources to the user (e.g., on a display) for the user to select from. Further for example, step 120 may comprise presenting any of a variety of types of information regarding wireless resources to a user and acquiring user input regarding the presented information.

In general, step 120 may comprise identifying one or more wireless resources based, at least in part, on the determined location.

The exemplary method 100 may, at step 130, comprise identifying respective manner(s) of communicating with the identified wireless resources(s) (e.g., as identified at step 120). Step 130 may comprise identifying the respective manner(s) of communicating with the identified wireless resource(s) in any of a variety of manners, non-limiting examples of which will be provided below.

For example, step 130 may comprise identifying at least one radio of a plurality of radios of the communication system (e.g., a mobile multimode communication device) to utilize to communicate with identified wireless resources (e.g., as identified at step 120). As a non-limiting example, a multimode communication device may comprise a first radio adapted to communicate utilizing a first communication protocol or standard (e.g., IEEE 802.11), a second radio adapted to communicate utilizing a second communication protocol or standard (e.g., Bluetooth) and a third radio adapted to communicate utilizing a third communication protocol or standard (e.g., IEEE 802.15). Continuing the non-limiting example, step 110 may comprise determining that the communication system implementing the method 100 is located in an office. Step 120 may then comprise identifying a first wireless resource (e.g., a video monitor) that communicates utilizing the second communication protocol and a second wireless resource (e.g., a LAN access point) that communicates utilizing the first communication protocol. Step 130 may then, for example, comprise identifying the second radio for communicating with the first wireless resource and identifying the first radio for communicating with the second wireless resource.

Also for example, step 130 may comprise identifying at least one radio configuration profile with which to configure a programmable radio of the communication system (e.g., a multimode communication device). As a non-limiting example, a multimode communication device may comprise a programmable radio that is configurable to communicate in accordance with a plurality of communication protocols (or standards). In a non-limiting exemplary scenario, a first configuration profile may correspond to communicating utilizing GSM, a second configuration profile may correspond to communicating utilizing EDGE, a third configuration profile may correspond to communicating utilizing IEEE 802.20, and a fourth configuration profile may correspond to communicating utilizing WCDMA. Continuing the non-limiting exemplary scenario, step 110 may comprise determining that the communication system implementing the method 100 is located in the home living room. Step 120 may then comprise identifying a first wireless resource (e.g., a set top box) and a second wireless resource (e.g., a GSM cellular network) associated with the home living room location. Step 130 may then comprise identifying the third configuration profile for communicating with the set top box utilizing IEEE 802.20 and identifying the first configuration profile for placing a telephone call utilizing the GSM cellular network.

For a non-limiting exemplary discussion of programmable radio configurations generally, refer to U.S. patent application Ser. No. 11/217,645, entitled "MULTIMEDIA COMMUNICATION DEVICE WITH CONFIGURATION UPDATE CAPABILITY," filed Sep. 1, 2005 (now U.S. Pat. No. 7,873,384), and U.S. patent application Ser. No. 11/423,049, filed Jun. 8, 2006, entitled "PROGRAMMABLE WIRELESS ACCESS POINT SUPPORTING CONFIGURATION PROFILE UPDATING," (now U.S. Pat. No. 7,929,486), which are hereby incorporated herein by reference in their entirety.

Further for example, step 130 may comprise identifying at least one communication protocol (or standard) of a plurality of communication protocols (or standards) to utilize for communications. In a non-limiting exemplary scenario, the communication system implementing the exemplary method 100 may be adapted to communicate utilizing a first communication protocol (e.g., IEEE 802.11), a second communication protocol (e.g., Bluetooth), a third communication protocol (e.g., IEEE 802.16) and a fourth communication protocol (e.g., WCDMA). Continuing the exemplary scenario, step 110 may comprise determining that the communication system implementing the system is located in a particular conference room in a particular building. Step 120 may then, for example, comprise identifying a first wireless resource (e.g., a Bluetooth-based wireless LAN access point), a second wireless resource (e.g., an IEEE 802.16-based video projector) and a third wireless resource (e.g., a Bluetooth-based audio output device). Continuing the exemplary scenario, step 130 may then comprise identifying the second communication protocol for communicating with the wireless LAN, the third communication protocol for communicating with the video projector and the second communication protocol for communicating with the audio output device.

Note that communication protocol (or standard) identification may also comprise various implementation details associated with a communication protocol. Such protocol implementation details may, for example and without limitation, comprise power information, frequency information, secure communication information, etc. Note also that such information may vary based on location. For example, different geographical regions may have different respective maximum power limits associated with the IEEE 802.11 standard and/or may require operation in different respective frequency bands. Accordingly, implementing a first protocol at a first location may be different from implementing the first protocol at a second location.

In general, step 130 may comprise identifying respective manner(s) of communicating with the identified wireless resources(s).

The exemplary method 100 may, at step 140, comprise communicating with the identified wireless resources (e.g., as identified at step 120) in particular respective manners (e.g., as identified at step 130). Step 140 may comprise communicating with the identified wireless resources in any of a variety of manners.

The exemplary method 100 may, at step 195, comprise performing continued processing. Such continued processing may comprise performing any of a variety of continued processing activities. For example and without limitation, as will be discussed later, step 195 may comprise maintaining wireless resource database information. Also for example, step 195 may comprise returning execution flow of the exemplary method 100 back to re-determine location at step 110 and continue operation. Further for example, step 195 may comprise receiving operational information from a user. Still further for example, step 195 may comprise periodically performing searches for unknown wireless resources and/or verification of the existence and/or availability of known wireless resources.

Figure 2:
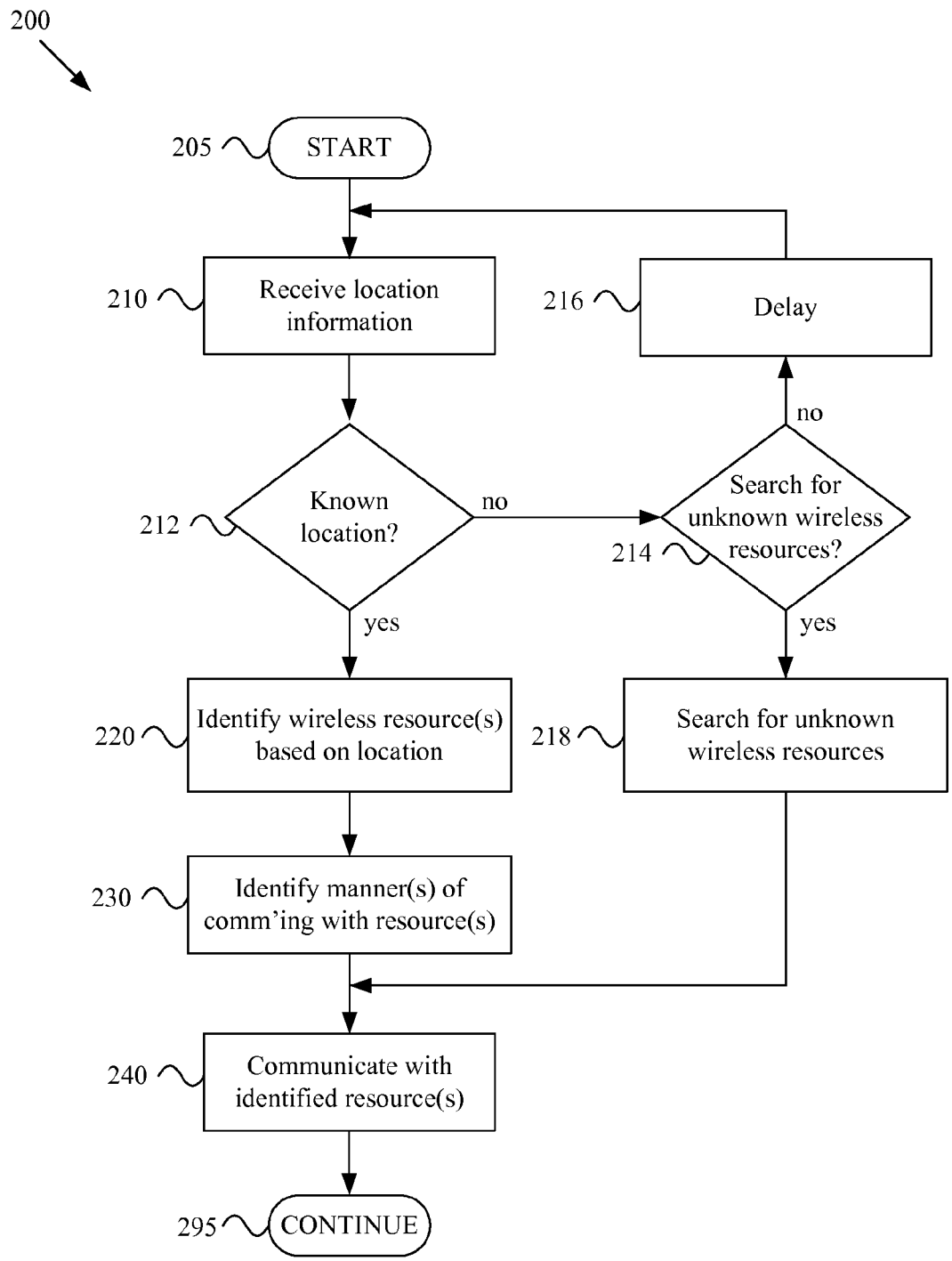
FIG. 2 is a diagram illustrating a second exemplary method for operating a communication system.

FIG. 2 is a diagram illustrating a method 200 for operating a communication system (e.g., a multimode communication device). The exemplary method 200 may, for example and without limitation, share any or all characteristics with the exemplary method 100 illustrated in FIG. 1 and discussed previously.

The exemplary method 200 may, at step 210, comprise receiving information regarding the location of the communication system (e.g., from a source external to the communication system/device implementing the method 200). Step 210 may, for example and without limitation, share any or all characteristics with step 110 of the exemplary method 100 discussed previously. For example, step 210 may comprise receiving such information from a dedicated navigational or positional system (e.g., GPS), from a communication network or device to which the communication system is communicatively coupled, from a user, etc.

The exemplary method 200 may, at step 212, comprise determining whether the communication system implementing the method 200 is located at (or near) a known location (e.g., a location at which the communication system has a communication history with known wireless resources). Step 212 may, for example and without limitation, comprise searching a database or other memory storage for information regarding the location. In a non-limiting exemplary scenario, step 212 may comprise determining that there is no database information corresponding to the location, and thus, determining that the location is unknown. In another non-limiting exemplary scenario, step 212 may comprise determining that there is database information corresponding to the location and that the information indicates that there are no known wireless resources associated with the location, and thus, determining that the location is to be treated as an unknown location. In a further non-limiting exemplary scenario, step 212 may comprise soliciting and receiving user input regarding a present location to determine whether the location is unknown or to be treated as unknown. In general, step 212 may comprise determining whether the location is unknown (or to be treated as such) in any of a variety of manners.

If step 212 comprises determining that the location is a known location, then step 212 may comprise directing execution flow of the exemplary method 200 to steps 220 and 230. Steps 220 and 230 may, for example, comprise identifying one or more wireless resources based, at least in part, on the determined location and identifying respective manner(s) for communicating with the identified wireless resources(s). Steps 220 and 230 may, for example and without limitation, share any or all characteristics with steps 120 and 130 of the exemplary method 100 illustrated in FIG. 1 and discussed previously.

If step 212 comprises determining that the location is not a known location, then step 212 may comprise directing execution flow of the exemplary method 200 to step 214. Step 214 may then, in turn, comprise determining whether to search for unknown wireless resources. Step 214 may comprise making such determination in any of a variety of manners. For example and without limitation, step 214 may comprise soliciting input from a user (e.g., in real time) regarding whether to search for unknown wireless resources. Also for example, step 214 may comprise making such determination by analyzing a pre-defined profile (e.g., defined in non-real time prior to the real-time need for such information) indicating whether to search for unknown wireless resources. Such a profile may, for example, indicate to the communication system implementing the method 200 the circumstances under which the communication system is to search for unknown wireless resources. As a further example, step 214 may comprise determining whether to search for unknown wireless resources based on present power supply levels of the communication system. As yet another example, step 214 may comprise always or never searching for unknown wireless resources.

If step 214 determines that no search for unknown wireless resources is to be conducted, then step 214 may comprise directing execution flow of the exemplary method 200 to step 216, which delays further execution of the method 200. Step 216 may, for example and without limitation, comprise implementing a predefined time delay (e.g., periodic, random or according to a predefined profile). Step 216 may also, for example, comprise waiting for any of a variety of events to occur before continuing execution of the method 200. After implementing the delay, step 216 may direct execution flow of the exemplary method 200 to step 210 for receiving updated information regarding the location of the communication system.

If step 214 determines that a search for unknown wireless resources is to be conducted, then step 214 may comprise directing execution flow of the exemplary method 200 to step 218, which comprises searching for unknown wireless resources. Various non-limiting exemplary manners of searching for unknown wireless resources were discussed previously. For example and without limitation, step 218 may comprise actively searching for unknown wireless resources. Such active searching may, for example, comprise transmitting beacon signals and analyzing return signals. Such active searching may also, for example, comprise communicating with a database (e.g., through the Internet and/or cellular telephony infrastructure) to determine whether there are any records of particular wireless resources associated with the location. Step 218 may alternatively, for example, comprise performing passive searching for wireless resources. Such passive searching may, for example, comprise passively listening for beacon signals or other signals transmitted by wireless resources. Such passive searching may also, for example, comprise passively listening for wireless resource identification information transmitted by other devices.

In various non-limiting exemplary scenarios, as part of searching for unknown wireless resources, step 218 may also comprise identifying respective manner(s) for communicating with the identified wireless resources(s). Examples of such manners of communication were presented previously with regard to step 130 of the exemplary method 100 discussed previously. For example and without limitation, step 218 may comprise analyzing received signals (e.g., beacon signals or responses to beacon signals) to determine a manner of communicating with identified wireless resources. Also for example, step 218 may comprise analyzing database information associated with identified wireless resources to determine such manners of communication. Further for example, step 218 may comprise communicating with a wireless resource using a first manner of communication to determine other manners of communication with which the wireless resource may communicate.

The exemplary method 200 may, at step 240, comprise communicating with the identified wireless resources (e.g., as identified at step 220 and/or step 218) in particular respective manners (e.g., as identified at step 230 and/or step 218). Step 240 may comprise communicating with the identified wireless resources in any of a variety of manners.

The exemplary method 200 may, at step 295, comprise performing continued processing. Such continued processing may comprise performing any of a variety of continued processing activities. For example and without limitation, as will be discussed later, step 295 may comprise maintaining wireless resource database information. Also for example, step 295 may comprise returning execution flow of the exemplary method 200 back to re-determine location at step 210 and continue operation. Further for example, step 295 may comprise receiving operational information from a user. Still further for example, step 295 may comprise periodically performing searches for unknown wireless resources and/or verification of the existence and/or availability of known wireless resources. Yet further for example, step 295 may comprise returning execution flow of the exemplary method 200 to step 214 to search for unknown wireless resources (e.g., even in a scenario involving a known location).

Figure 3:
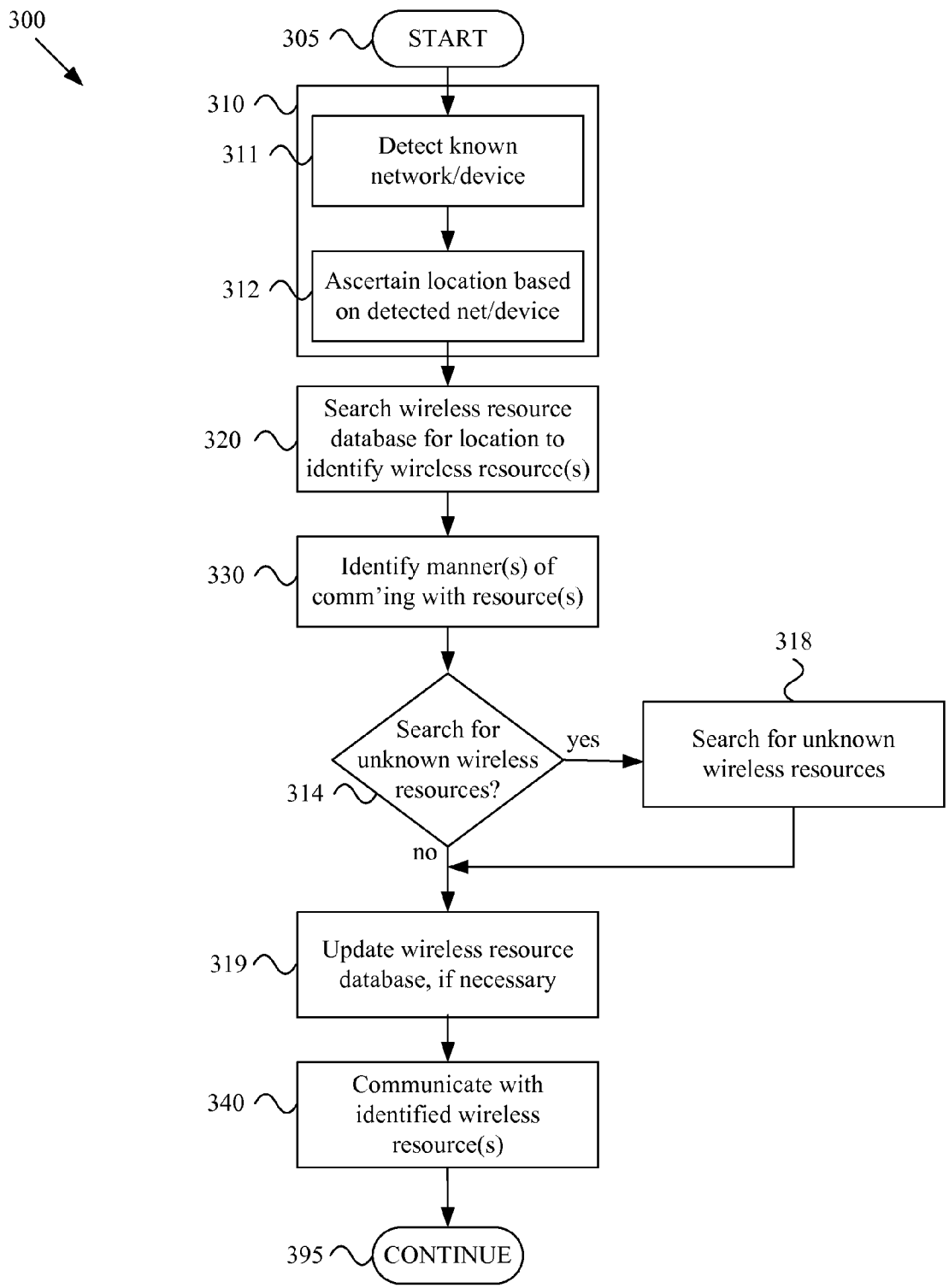
FIG. 3 is a diagram illustrating a third exemplary method for operating a communication system.

FIG. 3 is a diagram illustrating a third exemplary method 300 for operating a communication system (e.g., a multi-mode communication device. The exemplary method 300 may, for example and without limitation, share any or all characteristics with the exemplary methods 100, 200 illustrated in FIGS. 1-2 and discussed previously.

The exemplary method 300 may, at step 310, comprise determining location of a communication system implementing the method 300. Step 310 may, for example and without limitation, share any or all characteristics with steps 110 and 210 of the exemplary methods 100, 200 illustrated in FIGS. 1-2 and discussed previously.

As a non-limiting exemplary sub-step of step 310, the exemplary method 300 may, at step 311, comprise detecting a known communication network and/or electronic device. Such a communication network may, for example, be a wireless communication network, and such a device may, for example, comprise wireless communication capability. Such detection may, for example, comprise processing a received signal (e.g., a beacon or other signal) transmitted from a network or electronic device. Such detection may also, for example, comprise processing a message received from a network or electronic device in response to a transmitted signal (e.g., a beacon or other signal). Such detection may further, for example, comprise establishing two-way communication with a network or electronic device.

As another non-limiting exemplary sub-step of step 310, the exemplary method 300 may, at step 312, comprise ascertaining location of the communication system from one or more detected networks and/or devices. For example, step 312 may comprise utilizing knowledge of network and/or device location. As a non-limiting example, step 312 may comprise ascertaining that a communication system is in the home when a PAN associated with a home office and/or a printer associated with a home office is detected (e.g., detected at step 311). As another non-limiting example, step 312 may comprise ascertaining that the communication system is at the office when the office LAN is detected and/or a PC associated with the office is detected. As a further non-limiting example, step 312 may comprise ascertaining that the communication system is at a particular airport when the airport's LAN is detected, or that the communication system is in a particular city when the city's MAN or television station is detected. Step 312 may comprise ascertaining location of the communication system based on any of a variety of detected networks and/or devices (e.g., two-way communication network, one-way communication network, television network, radio network, office computer, printer, telephone, modem, router, fax machine, copier, keyboard, mouse, network access point, wireless router/modem, database or any device with communication capability or other detectable feature etc.).

The exemplary method 300 may, at step 320, comprise searching (e.g., querying) a wireless resource database to identify one or more wireless resources associated with the location (e.g., determined at step 310). Such a database may, for example, comprise stored information corresponding to wireless resources associated with particular locations. Such a database may, for example, reside on-board the communication system (e.g., in a non-volatile memory device) or may reside in another device communicatively coupled to the communication system (e.g., through a communication network, like a LAN or the Internet). Such a database may, for example, comprise stored information correlating one or more locations with one or more respective wireless resources.

Such a database may, for example, be maintained manually or automatically. For example, a user of the communication system may maintain information in the database and/or the communication system may itself maintain information in the database without interaction with a user. Such a database may, for example, be maintained specifically for the communication system or may be maintained for a plurality of communication systems that may access the database.

In a non-limiting exemplary scenario, the database may comprise information of wireless resources associated with a home, home office, family room, etc. Also for example, the database may comprise information of wireless resources associated with an office, office suite or group of offices. Further for example, the database may comprise information of wireless resources associated with a campus or metropolitan area.

The exemplary method 300 may, at step 330, comprise identifying respective manner(s) of communicating with the identified wireless resources(s) (e.g., as identified at step 320). Step 330 may, for example and without limitation, share any or all characteristics with steps 130 and 230 of the exemplary methods 100, 200 illustrated in FIGS. 1-2 and discussed previously. As a non-limiting example, step 330 may comprise identifying manner(s) of communicating with the identified wireless resource(s) by communicating with a database that includes stored information identifying manner(s) of communicating associated with particular wireless resources. Such a database may, for example, be the same database utilized at step 320 to identify the wireless resources.

The exemplary method 300 may, at steps 314 and 318, determine whether to search for unknown wireless resources and perform such searching if deemed necessary. Steps 314 and 318 may, for example and without limitation, share any or all characteristics with steps 214 and 218 of the exemplary method 200 discussed previously.

The exemplary method 300 may, at step 319, comprise maintaining (e.g., updating) a database of wireless resource information (e.g., as utilized at step 320 and/or step 330) associated with particular locations. Such updating may, for example, comprise updating the database regarding wireless resources previously identified as "known" resources, where such devices are no longer available. Such updating may also, for example, comprise updating the database regarding previously unknown wireless resources identified at step 318. As mentioned previously, such a database may be on-board the communication system or may be off-board.

The exemplary method 300 may, at step 340, comprise communicating with identified wireless resources as necessary. Step 340 may, for example and without limitation, share any or all characteristics with steps 140 and 240 of the exemplary methods 100, 200 illustrated in FIGS. 1-2 and discussed previously.

Figure 4:
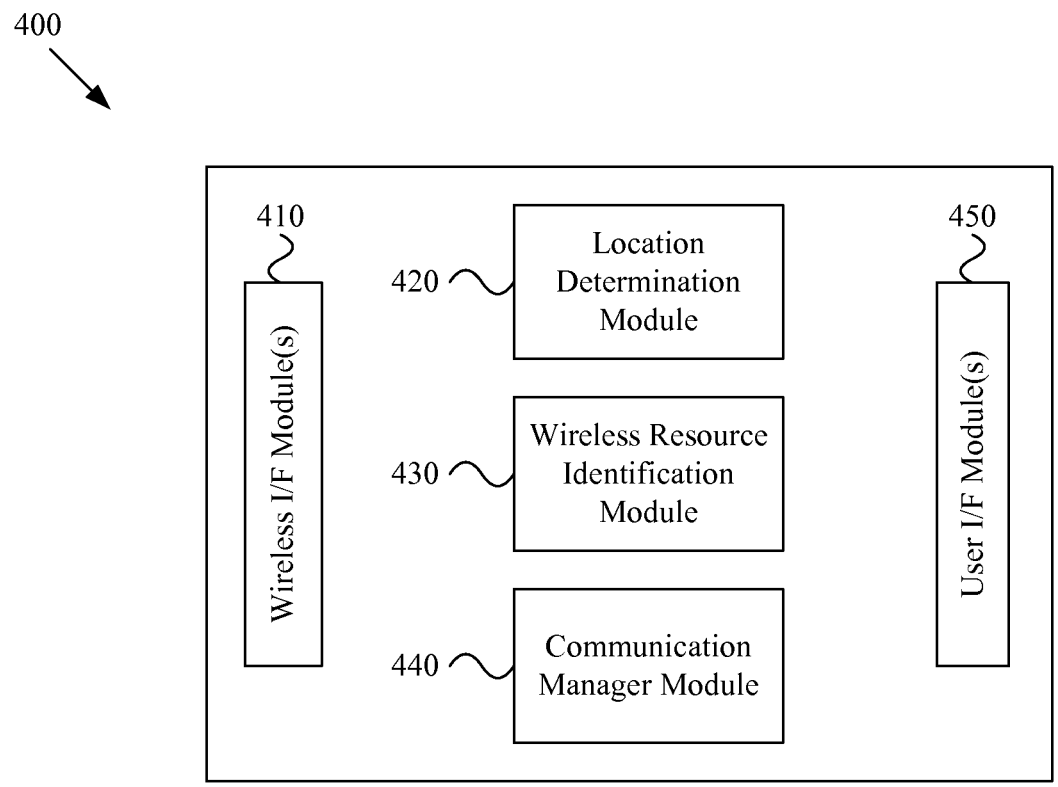
FIG. 4 is a diagram illustrating a portion of a first exemplary communication system.

FIG. 4 is a diagram illustrating a portion of a first exemplary communication system 400. The exemplary communication system 400 may, for example and without limitation, share any or all functional characteristics with the exemplary methods 100, 200, 300 illustrated in FIGS. 1-3 and discussed previously.

As explained previously with regard to FIG. 1, the exemplary communication system 400 may comprise characteristics of any of a variety of types of communication systems (e.g., fixed or mobile multimode communication devices).

The exemplary communication system 400 may comprise one or more wireless interface modules 410. The wireless interface module(s) 410 may comprise characteristics of any of a variety of wireless interface hardware and/or software. For example, the wireless interface module(s) 410 may comprise a plurality of radios dedicated to communicating in respective modes associated with respective communication protocols and/or standards. Also for example, the wireless interface module(s) 410 may comprise one or more programmable radios that are programmable to communicate in any of a plurality of communication modes, depending on the programming.

For a non-limiting exemplary discussion of programmable radio configurations generally, refer to U.S. patent application Ser. No. 11/217,645, entitled "MULTIMEDIA COMMUNICATION DEVICE WITH CONFIGURATION UPDATE CAPABILITY," filed Sep. 1, 2005 (now U.S. Pat. No. 7,873,384), and U.S. patent application Ser. No. 11/423,049, entitled "PROGRAMMABLE WIRELESS ACCESS POINT SUPPORTING CONFIGURATION PROFILE UPDATING," filed Jun. 8, 2006 (now U.S. Pat. No. 7,929,486), which are hereby incorporated herein by reference in their entirety.

The exemplary communication system 400 may further comprise one or more user interface modules 450. The user interface module(s) 450 may generally be adapted to provide a communication link between the communication system 400 and a user of the communication system 400. The user interface module(s) 450 may comprise characteristics of any of a variety of user interface module(s).

The exemplary communication system 400 may comprise a location determination module 420 adapted to determine a location of the communication system 400. The location determination module 420 may, for example and without limitation, share any or all functional characteristics with steps 110, 210 and 310 of the exemplary methods 100, 200, 300 illustrated in FIGS. 1-3 and discussed previously.

For example and without limitation, the location determination module 420 may be adapted to acquire (e.g., utilizing the wireless interface module(s) 410) and utilize location-related information received from various types of systems generally associated with positioning information (e.g., terrestrial and/or satellite-based positioning systems). As an example, the location determination module 420 may be adapted to receive and process GPS and/or UWB information to determine the location of the communication system 400. The location determination module 420 (or other module of the communication system 400, for example, the wireless interface modules 410) may, for example, comprise an on-board GPS and/or other location information receiver. Note that portions of a position tracking system may be included in the communication system 400.

Further for example, the location determination module 420 may be adapted to receive location information from a communication network (or network device) with which the communication system 400 has established communication (e.g., utilizing the wireless interface module(s) 410). As a non-limiting example, the location determination module 420 may be adapted to establish a communication link with an access point of a particular personal area network ("PAN") or local area network ("LAN") that then notifies the communication system 400 of the network or access point location.

Additionally for example, the location determination module 420 may be adapted to ascertain location of the communication system 400 from one or more detected communication networks. For example, the location determination module 420 may be adapted to utilize knowledge of communication network location. As a non-limiting example, the location determination module 420 may be adapted to ascertain that the communication system 400 is in the home when a PAN associated with a home office is detected (e.g., utilizing the wireless interface module(s) 410). As another non-limiting example, the location determination module 420 may be adapted to ascertain that the communication system 400 is at the office when the office LAN is detected. As a further non-limiting example, the location determination module 420 may be adapted to ascertain that the communication system 400 is at a particular airport when the airport's LAN is detected, or that the communication system 400 is in a particular city when the city's MAN is detected. The location determination module 420 may be adapted to ascertain location of the communication system 400 based on any of a variety of detected networks (e.g., two-way communication networks, one-way communication networks, television networks, radio networks, etc.).

Further for example, the location determination module 420 may be adapted to ascertain location of the communication system 400 from one or more detected electronic devices. For example, the location determination module 420 may be adapted to utilize knowledge of device location. As a non-limiting example, the location determination module 420 may be adapted to ascertain that the communication system 400 is in the home when a home device is detected (e.g., utilizing the wireless interface module(s) 410). Various examples of such devices were provided previously. As a further non-limiting example, the location determination module 420 may be adapted to ascertain that the communication system 400 is in the office when an office device is detected. Various examples of such devices were provided previously.

The location determination module 420 may, for example, be adapted to determine location of the communication system 400 by analyzing communication link conditions (e.g., utilizing the wireless interface module(s) 410). As a non-limiting example, the location determination module 420 may be adapted to determine that the communication system 400 is in the immediate vicinity of the office based on a relatively high-quality communication link between the communication system 400 and the office LAN. Continuing the example, the location determination module 420 may alternatively be adapted to determine that the communication system 400 is at least one block away from the office based on a relatively low-quality communication link between the communication system 400 and the office LAN. As another example, the location determination module 420 may be adapted to determine that the communication system 400 is home but not within the home office based on a relatively high-quality communication link with a home LAN and a relatively low-quality communication link with a home office PAN.

The location determination module 420 may further, for example, be adapted to determine location of the communication system 400 based on user input. As a non-limiting example, a user may explicitly indicate to the communication system 400 (e.g., through the user interface module(s) 450) that the communication system 400 is located in a particular city, building, room, campus, etc.

In general, the location determination module 420 may be adapted to determine location of the communication system 400.

The exemplary communication system 400 may comprise a wireless resource identification module 430 adapted to identify one or more wireless resources based, at least in part, on the determined location (e.g., as determined by the location determination module 420). The wireless resource identification module 430 may, for example and without limitation, share any or all functional characteristics with steps 120, 220 and 320 and with steps 212-218 and 314-318 of the exemplary methods 100, 200, 300 illustrated in FIGS. 1-3 and discussed previously.

The wireless resource identification module 430 may be adapted to identify one or more wireless resources in any of a variety of manners, non-limiting examples of which will be presented below. Various aspects of wireless resources and the identification of wireless resources were presented previously.

The wireless resource identification module 430 may, for example, be adapted to identify a list of wireless resources associated with the determined location. Such a list of wireless resources may, for example, comprise a list of wireless communication networks associated with the determined location. Such a list of wireless resources may, for example, comprise a list of electronic devices with wireless communication capability that are associated with the determined location. Such a list may also, for example, comprise any of a variety of types of information associated with a wireless resource (e.g., resource name, type, address (universal and/or local), characteristics, capabilities, communication protocols, availability, status, location, access privileges, etc.).

A list or other grouping of wireless resources associated with a determined location may, for example, be formed from information stored in a database. Such a database may, for example reside on-board the communication system 400 (e.g., in a non-volatile memory device) or may reside in another device communicatively coupled to the communication system 400 (e.g., through a communication network, like a LAN or the Internet). Such a database may, for example, comprise stored information correlating one or more locations with one or more respective wireless resources. As will be discussed in more detail later, such a database may be maintained manually or automatically and/or managed off-line or in real-time. A list of wireless resources may, for example, be exclusive or non-exclusive. That is, such a list may, for example, comprise a list of the only wireless resources that the communication system 400 is to utilize or may, for example, comprise a list of primary resources that the communication system 400 is to utilize while allowing for the utilization of other wireless resources that the communication system 400 determines are available.

The wireless resource identification module 430 may, for example, be adapted to identify a set of wireless resources of a plurality of predetermined sets of wireless resources, each of which might be associated with one or more particular locations. In a non-limiting exemplary scenario, a first set of wireless resources may be associated with a home location, a second set of wireless resources may be associated with an office location, a third set of wireless resources may be associated with a commute (or portion thereof), and a fourth set of wireless resources may be associated with a particular city. Note that in various exemplary scenarios (e.g., located in an office), a plurality of locations may be determined simultaneously (e.g., office, campus and city). Thus, in such exemplary scenarios, a plurality of sets of wireless resources may be simultaneously applicable.

Also for example, the wireless resource identification module 430 may be adapted to identify unknown wireless resources. For example, the wireless resource identification module 430 may be adapted to search for any wireless resources that are recognized and available. In various exemplary scenarios, the wireless resource identification module 430 may be adapted to utilize the wireless interface modules 410, or portions thereof, to perform such searching. Such identification may, for example, be performed in addition to, or in lieu of, identifying known wireless resources. As an example, the wireless resource identification module 430 may be adapted to determine that no wireless resources are known to be associated with the present location, and determine to search for all recognized and available resources within range of the location. Such searching may, for example, comprise performing active searching (e.g., sending beacons and waiting for responses) and/or passive searching (e.g., listening for beacons or other signals sent by other devices). In various exemplary scenarios, information of identified previously unknown resources may be stored in a database for future reference.

Additionally for example, the wireless resource identification module 430 may be adapted to verify the existence and/or availability of known resources. In various exemplary scenarios, the wireless resource identification module 430 may be adapted to utilize the wireless interface module 410, or portions thereof, to perform such searching. For example, the wireless resource identification module 430 may be adapted to first determine a list of wireless resources that are known to be generally available at a particular location, and then attempt to establish communication links with the known devices to verify that the known devices are currently available. As will be discussed later, information related to resource verification may be utilized to update database information for future reference.

In various exemplary scenarios, the wireless resource identification module 430 may also fail to identify any wireless resources associated with the location. In such a scenario, as discussed above, the wireless resource identification module 430 may be adapted to search for unknown resources. Alternatively, in such a scenario, the wireless resource identification module 430 may be adapted to not search for other resources (e.g., in an energy-saving mode or in accordance with a user-defined behavioral profile).

Still further for example, the wireless resource identification module 430 may be adapted to interact with a user regarding wireless resources. For example, the wireless resource identification module 430 may be adapted to receive a user input (e.g., utilizing the user interface modules 450) identifying a set of wireless resources to utilize until directed otherwise by the user. Also for example, the wireless resource identification module 430 may be adapted to present a plurality of sets of wireless resources to the user (e.g., on a display coupled to the user interface modules 450) for the user to select from. Further for example, the wireless resource identification module 430 may be adapted to utilize the user interface modules 450 to present any of a variety of types of information regarding wireless resources to a user and acquiring user input regarding the presented information.

As mentioned previously, the wireless resource identification module 430 may be adapted to determine whether the communication system 400 is located at (or near) a known location (e.g., a location at which the communication system 400 has a communication history with known wireless resources). In a non-limiting exemplary scenario, the wireless resource identification module 430 may be adapted to search (or query) a database or other memory storage for information regarding the location. In one example, the wireless resource identification module 430 may, for example, be adapted to determine that there is no database information corresponding to the location, and thus, determine that the location is unknown. In another example, the wireless resource identification module 430 may be adapted to determine that there is database information corresponding to the location and that the information indicates that there are no known wireless resources associated with the location, and thus, determine that the location is to be treated as an unknown location. In a further non-limiting exemplary scenario, the wireless resource identification module 430 may be adapted to solicit and receive user input (e.g., utilizing the user interface modules 450) regarding a present location to determine whether the location is unknown or to be treated as unknown. In general, the wireless resource identification module 430 may be adapted to determine whether the location is unknown (or to be treated as such) in any of a variety of manners.

If, for example, the wireless resource identification module 430 determines that the location is a known location, then the wireless resource identification module 430 may be adapted to identify one or more wireless resources based, at least in part, on the determined location and identify respective manner(s) for communicating with the identified wireless resources(s).

If, for example, the wireless resource identification module 430 determines that the location is not a known location, then the wireless resource identification module 430 may be adapted to determine whether to search for unknown wireless resources. The wireless resource identification module 430 may be adapted to make such a determination in any of a variety of manners. For example and without limitation, the wireless resource identification module 430 may be adapted to solicit input from a user (e.g., in real time utilizing the user interface modules 450) regarding whether to search for unknown wireless resources. Also for example, the wireless resource identification module 430 may be adapted to make such a determination by analyzing a pre-defined profile (e.g., defined in non-real time prior to the real-time need for such information) indicating whether to search for unknown wireless resources. Such a profile may, for example, indicate to the communication system 400 the circumstances under which the communication system 400 is to search for unknown wireless resources. As a further example, the wireless resource identification module 430 may be adapted to determine whether to search for unknown wireless resources based on present power supply levels of the communication system 400. As yet another example, the wireless resource identification module 430 may be adapted to always or never search for unknown wireless resources.

If the wireless resource identification module 430 determines that no search for unknown wireless resources is to be conducted, then the wireless resource identification module 430 may, in various scenarios, implement a delay of some sort (e.g., to conserve finite power resources). For example and without limitation, the wireless resource identification module 430 may be adapted to implement a predefined time delay (e.g., periodic, random or according to a predefined schedule or profile). The wireless resource identification module 430 may also, for example, be adapted to wait for any of a variety of events to occur before continuing operation. After implementing the delay, the wireless resource identification module 430 may be adapted to receiving updated information regarding the location of the communication system 400.

If the wireless resource identification module 430 determines that a search for unknown wireless resources is to be conducted, the wireless resource identification module 430 may be adapted to search for unknown wireless resources. Various non-limiting exemplary manners of searching for unknown wireless resources were discussed previously. For example and without limitation, the wireless resource identification module 430 may be adapted to actively search for unknown wireless resources. Such active searching may, for example, comprise transmitting beacon signals and analyzing return signals (e.g., utilizing the wireless interface modules 410). Such active searching may also, for example, comprise communicating with a database (e.g., locally, through the Internet and/or through the cellular telephony infrastructure) to determine whether there are any records of particular wireless resources associated with the location. The wireless resource identification module 430 may alternatively, for example, be adapted to perform passive searching for wireless resources (e.g., utilizing the wireless interface modules 410). Such passive searching may, for example, comprise passively listening for beacon or other signals transmitted by wireless resources. Such passive searching may also, for example, comprise passively listening for wireless resource identification information transmitted by other devices.

As part of searching for unknown wireless resources, the wireless resource identification module 430 may also be adapted to identify respective manner(s) of communicating with the identified wireless resources(s). Examples of such manners of communication were presented previously. For example and without limitation, the wireless resource identification module 430 may be adapted to analyze received signals (e.g., beacon signals or responses to beacon signals) to determine a manner of communicating with identified wireless resources. Also for example, the wireless resource identification module 430 may be adapted to analyze database information associated with identified wireless resources to determine such manners of communication. Further for example, the wireless resource identification module 430 may be adapted to communicate with a wireless resource using a first manner of communication (e.g., utilizing the wireless interface modules 410) to determine other manners of communication with which the wireless resource may communicate.

In general, the wireless resource identification module 430 is adapted to identify one or more wireless resources based, at least in part, on the determined location.

The exemplary communication system 400 may also comprise a communication manager module 440 adapted to identify respective manner(s) of communicating with the identified wireless resource(s) (e.g., as identified by the wireless resource identification module 430). The communication manager module 440 may, for example and without limitation, share any or all functional characteristics with steps 130, 230 and 330 and with steps 140, 240 and 340 of the exemplary methods 100, 200, 300 illustrated in FIGS. 1-3 and discussed previously.

The communication manager module 440 may, for example, be adapted to identify respective manner(s) of communicating with the identified wireless resources(s) (e.g., as identified by the wireless resource identification module 430). The communication manager module 440 may be adapted to identify the respective manner(s) of communicating with the identified wireless resource(s) in any of a variety of manners, non-limiting examples of which will be presented below.

For example, the communication manager module 440 may be adapted to identify at least one radio of a plurality of radios of the communication system 400 to utilize to communicate with identified wireless resources (e.g., as identified by the wireless resource identification module 430). As a non-limiting example, the communication system 400 may (e.g., as wireless interface modules 410) comprise a first radio adapted to communicate utilizing a first communication protocol or standard (e.g., IEEE 802.11), a second radio adapted to communicate utilizing a second communication protocol or standard (e.g., Bluetooth) and a third radio adapted to communicate utilizing a third communication protocol or standard (e.g., IEEE 802.15). Continuing the non-limiting example, the location determination module 420 may determine that the communication system 400 is located in an office. The wireless resource identification module 430 may then identify a first wireless resource (e.g., a video monitor) that communicates utilizing the second communication protocol and a second wireless resource (e.g., a LAN access point) that communicates utilizing the first communication protocol. The communication manager module 440 may then, for example, identify the second radio for communicating with the first wireless resource and identify the first radio for communicating with the second wireless resource.

Also for example, the communication manager module 440 may be adapted to identify at least one radio configuration profile with which to configure a programmable radio (e.g., of the wireless interface modules 410) of the communication system 400. As a non-limiting example, a multi-mode communication device may comprise a programmable radio that is configurable to communicate in accordance with a plurality of communication protocols (or standards). In a non-limiting exemplary scenario, a first configuration profile may correspond to communicating utilizing GSM, a second configuration profile may correspond to communicating utilizing EDGE, a third configuration profile may correspond to communicating utilizing IEEE 802.20, and a fourth configuration profile may correspond to communicating utilizing WCDMA. Continuing the non-limiting exemplary scenario, the location determination module 420 may determine that the communication system 400 is located in the home living room. The wireless resource identification module 430 may then identify a first wireless resource (e.g., a set top box) and a second wireless resource (e.g., a GSM cellular network) associated with the home living room location. The communication manager module 440 may then identify the third configuration profile for communicating with the set top box utilizing IEEE 802.20 and identify the first configuration profile for placing a telephone call utilizing the GSM cellular network.

Further for example, the communication manager module 440 may be adapted to identify at least one communication protocol (or standard) of a plurality of communication protocols (or standards) to utilize for communications. In a non-limiting exemplary scenario, the communication system 400 (e.g., the wireless interface modules 410) may be adapted to communicate utilizing a first communication protocol (e.g., IEEE 802.11), a second communication protocol (e.g., Bluetooth), a third communication protocol (e.g., IEEE 802.16) and a fourth communication protocol (e.g., WCDMA). Continuing the exemplary scenario, the location determination module 420 may determine that the communication system 400 is located in a particular conference room in a particular building. The wireless resource identification module 430 may then, for example, identify a first wireless resource (e.g., a Bluetooth-based wireless LAN access point), a second wireless resource (e.g., an IEEE 802.16-based video projector) and a third wireless resource (e.g., a Bluetooth-based audio output device). Continuing the exemplary scenario, the communication manager module 440 may then identify the second communication protocol for communicating with the wireless LAN, the third communication protocol for communicating with the video projector and the second communication protocol for communicating with the audio output device.

Note that communication protocol (or standard) identification may also comprise various implementation details associated with a communication protocol. Such protocol implementation details may, for example and without limitation, comprise power information, frequency information, secure communication information, etc. Note also that such information may vary based on location. For example, different regions may have different respective maximum power limits associated with the IEEE 802.11 standard and/or may require operation in different respective frequency bands. Accordingly, implementing a first protocol at a first location may be different from implementing the first protocol at a second location.

In general, the communication manager module 440 may be adapted to identify respective manner(s) of communicating with the identified wireless resources(s).

The communication manager module 440 may (e.g., utilizing the wireless interface modules 410 be adapted to communicate with the identified wireless resources (e.g., as identified by the wireless resource identification module 430) in particular respective manners (e.g., as identified by the communication manager module 440). The communication manager module 440 may be adapted to communicate with the identified wireless resources in any of a variety of manners (e.g., utilizing the wireless interface modules 410).

The communication system 400 may generally perform any of a variety of types of additional processing. For example, the communication system 400 (or a module thereof) may be adapted to maintain wireless resource database information. Also for example, the location determination module 420 may be adapted to re-determine location of the communication system 400 and continue operation. Further for example, the communication system 400 may be adapted to receive operational information from a user (e.g., through the user interface modules 450). Still further for example, the wireless resource identification module 430 may be adapted to periodically perform searches for unknown wireless resources and/or verifying the existence and/or availability of known wireless resources.

Figure 5:
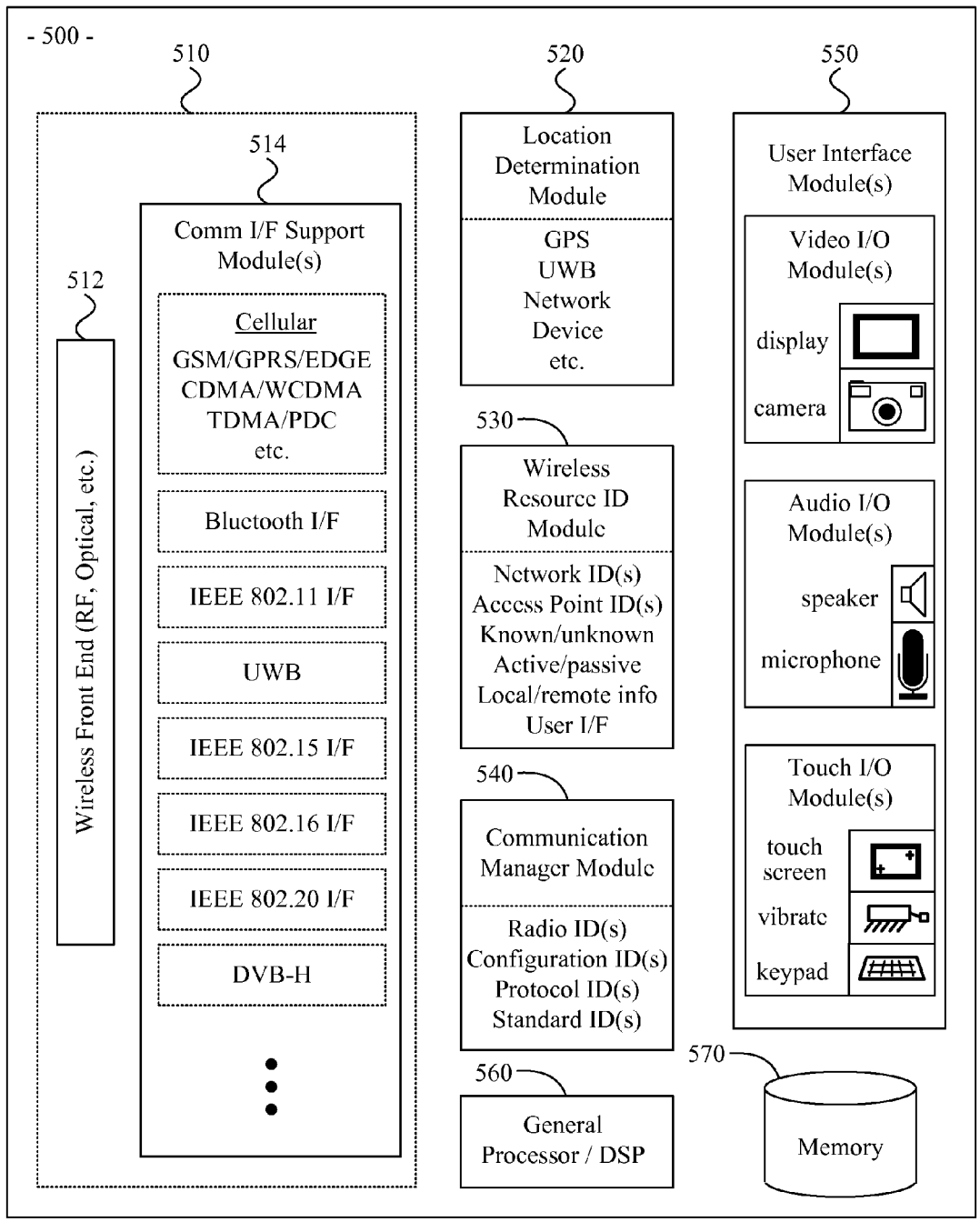
FIG. 5 is a diagram illustrating a portion of a second exemplary communication system.

FIG. 5 is a diagram illustrating a portion of a second exemplary communication system 500. The exemplary communication system 500 may share any or all characteristics with the exemplary system 400 illustrated in FIG. 4 and discussed previously, and may share any or all functional characteristics with the exemplary methods 100, 200, 300 illustrated in FIGS. 1-3 and discussed previously.

The exemplary communication system 500 (e.g., a multimode communication device or mobile multimode communication device) may comprise one or more wireless communication interface modules 510, including a wireless front-end 512 and various communication interface support modules 514 corresponding to various communication modes (e.g., protocols and/or standards). The wireless communication interface modules 510 may share any or all characteristics with the communication interface modules 410 illustrated in FIG. 4 and discussed previously.

The wireless front-end 512 may, for example, comprise various components adapted to communicate over an RF interface or non-tethered optical interface. The communication interface support modules 514 may, for example, comprise hardware and/or software modules adapted to communicate in any of a variety of communication modes (e.g., in accordance with various protocols and/or standards). For example and without limitation, the communication interface support modules 514 may comprise hardware and/or software modules adapted to support communication over protocols/standards comprising GSM/GPRS/EDGE, CDMA/WCDMA, TDMA/PDC, Bluetooth, IEEE 802.11, UWB, IEEE 802.15, IEEE 802.16, IEEE 802.20, DVB-H, etc.

The exemplary communication system 500 may also comprise a location determination module 520, which may share any or all characteristics with the location determination module 420 illustrated in FIG. 4 and discussed previously. For example, the location determination module 520 may be adapted to determine location of the communication system 500 utilizing GPS, UWB, network identification, device identification, etc.

The exemplary communication system 500 may additionally comprise a wireless resource identification module 530, which may share any or all characteristics with the wireless resource identification module 430 illustrated in FIG. 4 and discussed previously. For example, the wireless resource identification module 530 may be adapted to determine identify of networks, access points, devices with wireless communication capability, or any known or unknown wireless resources. The wireless resource identification module 530 may be adapted to identify wireless resources in any of a variety of manners, including database searching, active and/or passive searching, accessing local and/or remote resource identification information, utilizing information obtained through user interaction, etc.

The exemplary communication system 500 may further comprise a communication manager module 540, which may share any or all characteristics with the communication manager module 440 illustrated in FIG. 4 and discussed previously. For example, the communication manager module 540 may be adapted to identify manners of communication with various wireless resources and to manage communication with various wireless resources. For example, the communication manager module 540 may be adapted to identify various radios, radio configurations, protocols and/or standards to utilize for communication with various wireless resources.

The exemplary communication system 500 may, for example, comprise a general processor or digital signal processor 560 and a memory 570. The processor 560 and memory 570 may be adapted to implement various aspects with the processor 560 executing software instructions stored in the memory 570. For example and without limitation, the processor 560 may implement a portion of (or all of) the functionality of the location determination module 520, wireless resource identification module 530 and/or communication manager module 540.

Also for example, as discussed previously, various aspects of wireless resource identification may involve utilizing memory on-board the communication system 500 (e.g., analyzing and/or maintaining a wireless resource database). The memory 570 may be utilized for such a purpose.

The exemplary system 500 further includes one or more user interface modules 550, which may share any or all characteristics with the user interface modules 450 illustrated in FIG. 4 and discussed previously. For example and without limitation, the user interface modules 550 may comprise video input/output modules (e.g., a display module, camera module, etc.), audio input/output modules (e.g., a speaker, microphone module, etc.), and/or touch or tactile input/output modules (e.g., a touch screen module, vibratory output module, keypad module, etc.).

For illustrative clarity, the exemplary systems 400, 500 were presented in terms of various functional modules. Various modules may, for example, be implemented in hardware, software or a combination thereof. Various modules may, for example, be implemented in a single integrated circuit or combination of integrated circuits. Also, various modules may share various sub-modules and/or subcomponents. For example and without limitation, various hardware modules may share various electrical components, and various software modules may share various software subroutines.

In summary, various aspects provide a system and method providing location based wireless resource identification in a communication system. It will be understood by those skilled in the art that various changes may be made and equivalents may be substituted. In addition, many modifications may be made to adapt a particular situation or material to the teachings above without departing from its scope.

What is claimed is:

1. A method comprising:
in a communication device:
determining whether a set of pre-determined recognized devices is accessible via a Bluetooth communication protocol;
responsive to determining that the set of pre-determined recognized devices are accessible via the Bluetooth communication protocol:
identifying a wireless local area network (WLAN) communication protocol implemented by the communication device;
determining a location of the communication device based on the set of pre-determined recognized devices;
accessing a wireless resource database entry in a wireless resource database corresponding to the location to identify a pre-determined wireless network as accessible to the communication device via the WLAN communication protocol instead of performing a wireless resource scan to identify the pre-determined wireless network; and
determining access privileges for the pre-determined wireless network;
establishing a connection with the pre-determined wireless network using the access privileges;
responsive to determining that the set of pre-determined recognized devices is not accessible via the Bluetooth communication protocol:
performing the wireless resource scan to determine whether a pre-determined wireless network is accessible via the WLAN communication protocol by:
transmitting a beacon compliant with the WLAN communication protocol; and
analyzing a return signal responsive to the beacon; and
after performing the wireless resource scan;
adding the wireless resource database entry to the wireless resource database; and
accessing the wireless resource database entry for the pre-determined wireless network to identify the pre-determined wireless network as accessible rather than performing the wireless resource scan.

2. The method of claim 1, where performing the wireless resource scan further comprises listening for a beacon compliant with the WLAN communication protocol.

3. The method of claim 1, where accessing the wireless resource database entry comprises contacting the wireless resource database via a cellular communication protocol.

4. The method of claim 1, where the set of pre-determined recognized devices comprise a printer, a telephone, a television, a stereo, a video game console, an environmental control system, an alarm system, a modem, a fax machine, a copier, a keyboard, a mouse, or any combination thereof.

5. The method of claim 1, where determining the location of the communication device comprises determining that the communication device is located within a pre-determined room within a building.

6. The method of claim 1, where
the wireless resource database is stored in memory onboard the communication device.

7. The method of claim 1, further comprising executing a delay timer before preforming a future determination of available wireless resources responsive to determining that the set of pre-determined recognized devices is not accessible via the Bluetooth communication protocol.

8. A communication device comprising:
network interface circuitry configured to:
perform a device scan in accord with a Bluetooth communication protocol;
perform a wireless resource scan to determine whether a wireless network is accessible through a wireless local area network (WLAN) communication protocol by:
transmitting a beacon compliant with the communication protocol; and
analyzing a return signal sent responsive to the beacon; and
establish a communication link to the wireless network in accord with the WLAN communication protocol using access privileges; and
control circuitry coupled to the network interface circuitry, the control circuitry configured to:
responsive to the device scan indicating that pre-determined recognized devices are accessible via the Bluetooth communication protocol, determine a location of the communication device;

based on the location of the communication device, access a wireless resource database entry corresponding to the location to identify the wireless network as accessible to the communication device via the WLAN communication protocol instead of causing the network interface circuitry to perform the wireless resource scan;

after identifying the wireless network as accessible, determine the access privileges for the wireless network;

responsive to the device scan not indicating that the pre-determined recognized devices are not determined to be accessible via the Bluetooth communication protocol, cause the network interface circuitry to perform the wireless resource scan; and after performing the wireless resource scan:
add a wireless resource database entry to a wireless resource database; and
access the wireless resource database entry to identify the wireless network as accessible rather than performing a subsequent wireless resource scan.

9. The communication device of claim 8, where the control circuitry is configured to determine the location of the communication device by determining that the communication device is located within a pre-determined room within a building.

10. The communication device of claim 8, where the network interface circuitry is configured to perform the wireless resource scan by further listening for a beacon compliant with the WLAN communication protocol.

11. The communication device of claim 8, where the control circuitry is configured to access the wireless resource database entry by contacting the wireless resource database via a cellular communication protocol.

12. The communication device of claim 8, where the pre-determined recognized devices comprise a printer, a telephone, a television, a stereo, a video game console, an environmental control system, an alarm system, a modem, a fax machine, a copier, a keyboard, a mouse, or any combination thereof.

13. The communication device of claim 8, where the control circuitry is further configured to execute a delay timer before preforming a future determination of available wireless resources responsive to determining that the pre-determined recognized devices is not accessible via the Bluetooth communication protocol.

14. The communication device of claim 8, where the communication device further comprises onboard memory configured to store the wireless resource database.

15. A product comprising:
a machine-readable medium other than a transitory signal; and
instructions stored on the machine-readable medium that, when executed, cause a processor to:
perform, via Bluetooth interface circuitry, a Bluetooth device scan;
determine whether a specified set of devices were detected during the device scan;
responsive to detecting the specified set of devices during the Bluetooth device scan, determine a location for the Bluetooth interface circuitry;
responsive to the location of the Bluetooth interface circuitry, forgo a wireless resource scan for a wireless local area network (WLAN) and instead identify the WLAN as being available without having performed the wireless resource scan by accessing a wireless resource database entry corresponding to the location;
initiate a connection to the WLAN;
responsive to not detecting the specified set of devices during the Bluetooth device scan, perform the wireless resource scan by:
transmitting a beacon compliant with a WLAN communication protocol; and
analyzing a return signal sent responsive to the beacon; and
after performing the wireless resource scan:
add the wireless resource database entry to a wireless resource database; and
reference the wireless resource database entry to identify the WLAN as accessible rather than performing a subsequent wireless resource scan.

16. The product of claim 15, where the instructions further cause the processor to execute a delay timer before preforming a future determination of available wireless resources responsive to not detecting the specified set of devices during the device scan.

17. The product of claim 15, where the instructions further cause the processor to perform the wireless resource scan by listening for a beacon compliant with the WLAN communication protocol.

18. The product of claim 15, where the instructions further cause the processor to access the wireless resource database entry by contacting the wireless resource database via a cellular communication protocol.

19. The product of claim 15, where the specified set of devices comprise a printer, a telephone, a television, a stereo, a video game console, an environmental control system, an alarm system, a modem, a fax machine, a copier, a keyboard, a mouse, or any combination thereof.

20. The product of claim 15, where the instructions further cause the processor to determine the location of the Bluetooth interface circuitry by determining that the Bluetooth interface circuitry is located within a pre-determined room within a building.

* * * * *